Jan. 26, 1965   A. J. SOBEY   3,167,017
ATTITUDE CONTROL
Filed Nov. 7, 1960   2 Sheets-Sheet 1

INVENTOR.
Albert J. Sobey
BY
Paul Fitzpatrick
ATTORNEY

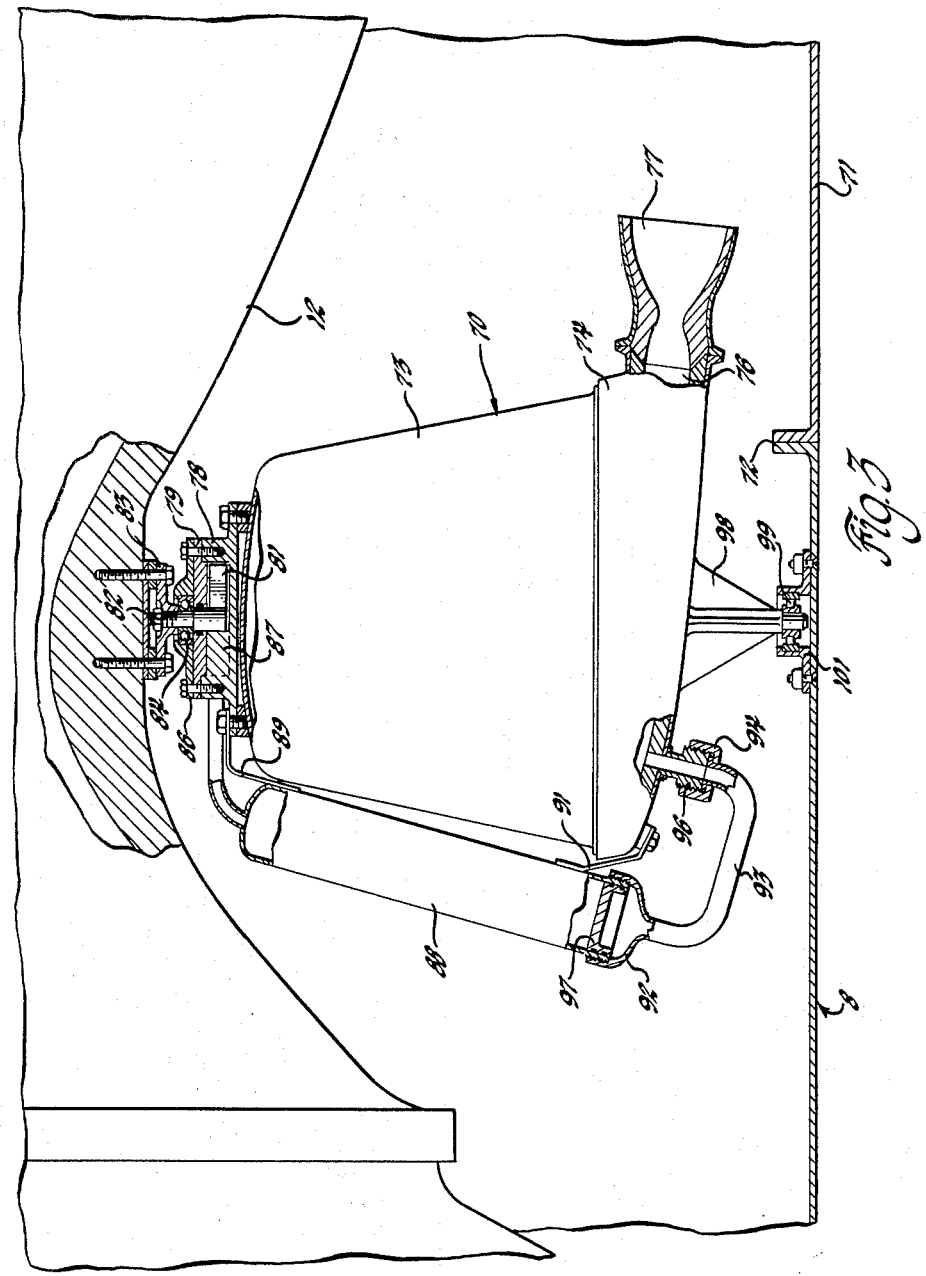

3,167,017
ATTITUDE CONTROL
Albert J. Sobey, Indianapolis, Ind., assignor to General Motors Corporation, Detroit, Mich., a corporation of Delaware
Filed Nov. 7, 1960, Ser. No. 67,848
5 Claims. (Cl. 102—50)

My invention is directed to reaction engines which may be steered or directed, and particularly to such engines of a type suited for attitude control of vehicles such as rockets, missiles, and spacecraft. Many ways of steering or maintaining a prescribed attitude of such vehicles have been proposed including steerable main propulsion engines, vanes or other structures for deflecting the propulsion jet, steerable propulsion nozzles, fixed intermittently actuated laterally directed jets, and so on. Many considerations favor the employment of steerable auxiliary jet or reaction engines for such purposes. My invention is directed to a particularly desirable organization of a steerable auxiliary reaction engine of the rocket type with means for directing it to control the direction of the thrust axis.

Attitude control involves the control of the orientation of the vehicle about three mutually perpendicular axes of roll, pitch, and yaw. Such control may conveniently be achieved by four jets directed generally parallel to the longitudinal or roll axis of the vehicle, two of which are steerable to control pitch and two steerable to control yaw. By differential actuation of the two sets of nozzles, a roll couple may be developed to orient the vehicle or, if desired, to create spin of the vehicle. Such an installation has the advantage that the net thrust of the control jets is substantially along the axis of the vehicle and contributes to the propulsive effect. Such attitude control jet installations respond to known control systems which develop suitable control signals to operate the mechanisms for steering or directing the control rockets. Since such control systems are well known, and since my invention is not concerned with them, they will not be described.

The nature of the invention and the advantages thereof will be apparent to those skilled in the art from the succeeding detailed description of preferred embodiments of my invention and the accompanying drawings thereof.

FIGURE 3 is a view similar to FIGURE 2 of a modified structural embodiment.

Figure 1:
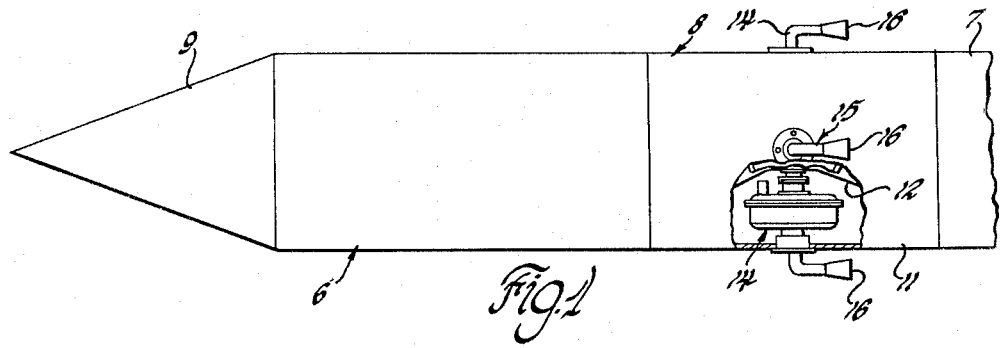
FIGURE 1 is a partial view of an aerial or space vehicle with parts cut away, shown with its longitudinal or roll axis horizontal.

FIGURE 1, which is a somewhat schematic view of a vehicle, illustrates the nature of the preferred overall installation of attitude control engines in accordance with the invention. The vehicle 6 may comprise several stages, which may be a first stage 7, a second stage 8, and a payload or third stage 9. The second stage includes a cylindrical case or fairing 11 enclosing the nozzle 12 of a main propulsion engine. Four steerable reaction engines or rocket assemblies 14, 15, three of which are illustrated in part, are spaced equally around the longitudinal axis of the vehicle abreast of the throat of nozzle 12. Each rocket includes a nozzle 16 directed rearwardly of the vehicle. The rocket assemblies 14 and 15 may be rotated about mutually perpendicular axes normal to the longitudinal axis of the vehicle. Assuming that the pitch axis is horizontal and the yaw axis vertical as illustrated in FIGURE 1, rocket motors 15 may be steered to control the vehicle in pitch and the motors 14 to control it in yaw. By steering any two of the motors, preferably two on the same axis, in opposite directions, roll may be corrected or induced.

Figure 2:
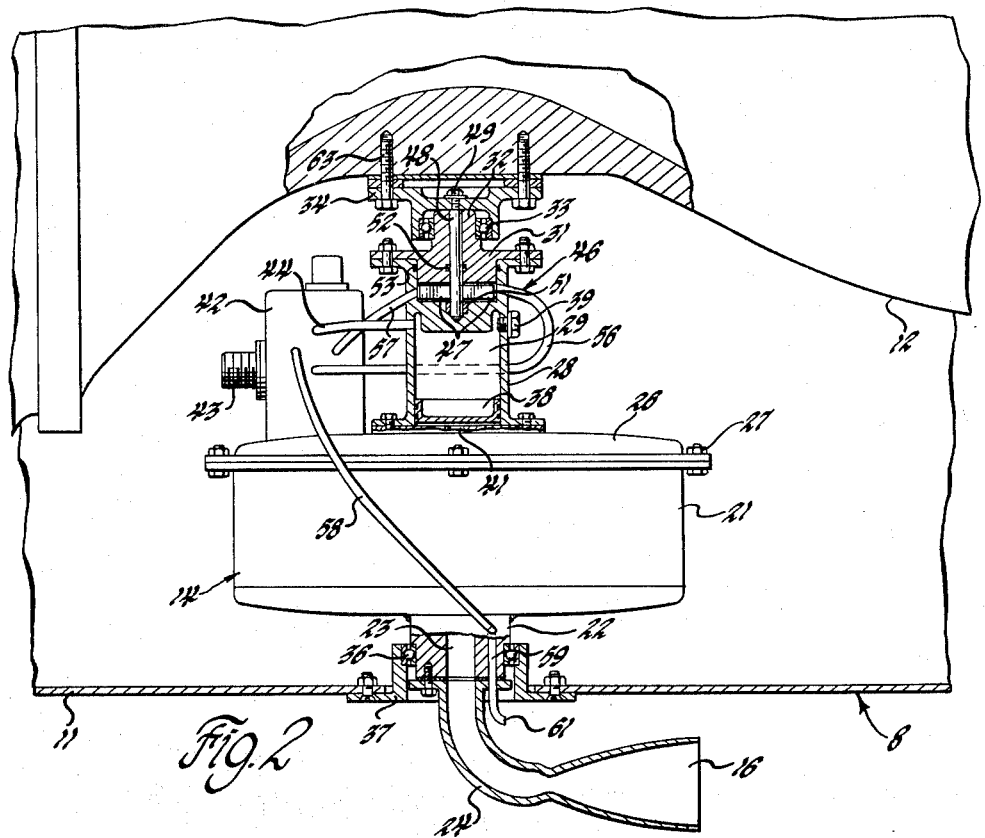
FIGURE 2 is an enlarged view of a portion of FIGURE 1 with parts cut away and in section.

FIGURE 2 illustrates the installation and structure of an attitude control rocket means 14. The assembly comprises a rocket case 21, preferably containing solid propellant, which is integral with a hollow stub shaft 22 defining the outlet passage 23 from the propellant case. An elbow 24, bolted to the shaft 22, provides a passage communicating with passage 23 and terminating in jet nozzle 16. Preferably, nozzle 16 is at 90° to the axis of case 21.

The case 21 is generally cylindrical and of lesser altitude than diameter to accommodate it to the space limitations of the installation. It comprises a cover 26 attached by bolts 27 to the body of the case 21. A flanged cylinder 28, defining a cavity or reservoir 29 for hydraulic fluid, is bolted to the center of the cover 26. A head 31, piloted into and bolted to the cylinder 28, terminates in a spindle 32 rotatably mounted by ball bearing 33 in a support 34 bolted to the nozzle 12. Bearing 33 is coaxial with a second ball bearing 36 fitted onto the stub shaft 22 and mounted in a support 37 bolted to the fairing 11. Bearings 33 and 36 define an axis, normal to the roll axis of the vehicle, about which the engine 14 is rotatable.

Proceeding with the means for steering or rotating the engine 14, the reservoir 29 has been referred to previously. A floating piston 38 mounted in cylinder 28 defines one end of the reservoir, which may be filled through a removable plug 39. A small hole 41 through the engine case cover 26 allows motive fluid to pass from the gas generator 21 into the space below the piston 28 (as illustrated) and thereby pressurize the hydraulic fluid contained in the reservoir as soon as the steering rocket 14 is ignited by any suitable means (not illustrated). The hydraulic fluid is controlled by an electrically operated reversing valve 42, which may be of various known commercial types, the valve being suitably mounted on the rocket engine; for example, the valve case may be welded or bolted to the cover 26. The valve includes one portion 43 of an electric connector by which control leads (not shown) enter the valve body to operate the valve electromagnetically and control the flow of hydraulic fluid under pressure from the reservoir 29 through line 44 and valve 42 to a hydraulic steering motor 46. The motor 46 is preferably a vane type motor coaxial with bearings 33 and 36. As illustrated in FIGURE 2, the motor comprises two fixed vanes 47 integral with a stationary shaft 48 splined or keyed to the bearing support 34 and retained by a nut 49.

The vanes 47 are disposed in a cavity defined between the hydraulic fluid reservoir case 28 and the head 31, in which are vanes integral with the head 31 between vanes 47.

An anti-friction bushing 51 is provided between the shaft 48 and the case 28, and suitable O-ring seals 52 and 53 are provided. The operating chambers of the motor 46 are supplied from and exhausted by the valve 42 through hydraulic fluid lines 56 and 57. Hydraulic fluid exhausting from the valve is conducted by a line 58 which communicates with a passage 59 through the stub shaft 22 terminating in an overload vent line 61. The vent 61 is disposed parallel to the nozzle 16 so that the discharged hydraulic fluid contributes slightly to the steering thrust.

It will be noted that the steering rocket, the hydraulic fluid reservoir, the control valve, and the hydraulic motor comprise a unitary assembly which may be assembled prior to mounting in the vehicle. To mount the assembly in the vehicle, it is moved into place and the support 34 is fixed to the propulsion nozzle 12 by bolts 63. The outer bearing retainer 37 is then bolted into place to complete the mounting of the gas generator and the nozzle 16, including the hydraulic fluid exhaust pipe 61, is then mounted in place. If desired, the nozzle 16 may be provided with a fairing or windshield extending ahead of and over it, which is not shown.

FIGURE 3 illustrates variations in the steering rocket assembly and its installation. The steering or attitude control rocket assembly 70 illustrated in FIGURE 3 is, like the assemblies 14 and 15 of FIGURES 1 and 2, mounted abreast of the throat of a main propulsion nozzle 12 of one stage of a rocket vehicle. In this case, it is assumed that the nozzle 12 is that of a second stage rocket which has an outer casing or fairing 8 which remains with the rocket and an outer case section or fairing 71 which is detached from the section 8 at the joint 72 when the first stage rocket is detached from the second stage rocket.

In the installation of FIGURE 3, the steering engine 70 is mounted within the case section 8 and projects past the rear end thereof at the joint 72. The physical dimensions and locations of the structures are varied to some extent. The steering device of FIGURE 3 includes a conical case 73 which is loaded with a solid propellant and is closed by cover 74 defining an outlet 76 to which is attached the converging-diverging nozzle 77. The nozzle 77 is directed slightly outwardly from the axis of the main nozzle 12. The steering motor housing 78 mounted on the end of case 73 has fixed to it a head 79 defining with it the chamber of a vane-type hydraulic motor within which is mounted a fixed vane 81. Vane 81 is integral with shaft 82 fixed to a plate 83 which is bolted to the throat section of the main nozzle 12. A ball bearing 84 is disposed between the shaft 82 and a bearing retainer 86 fixed to the housing 78. The vane motor 81 illustrated is of the single vane type, the vane coacting with a rib 87 on the motor body 81 to define two chambers to which hydraulic actuating fluid is selectively admitted by a two-way control valve of known type (not shown) which may be mounted behind the casing 73 as the device is illustrated. The valve may be of any suitable structure such as that illustrated in FIGURE 2. The actuating fluid for the steering motor is supplied from a cylindrical reservoir 88 mounted on the assembly by brackets 89 and 91 and having a head 92 integral with a pressure line 93. The pressure line 93 is coupled by a nut 94 to a pressure connection 96 in the cover 74. When the propellant in the case 73 is ignited, a small portion of the resulting combustion products flow through the line 93 and exerts pressure on a piston 97 floating in the cylinder 88. Hydraulic fluid filling the cylinder above the piston is thus made available for actuation of the motor 81 to direct the steering rocket nozzle 77. A second support for the steering rocket assembly is provided by a strut 98 extending from the cover 74 and rotatably supported by a roller bearing 99 in a bracket 101 bolted to the outer case.

As will be apparent, both forms of the invention provide a very simple unitary assembly of a steering rocket engine. While only a small amount of hydraulic fluid is available, the steering rocket is intended for only a short period of use before burn-out, and the supply will be entirely adequate for steering during this short period. The steering assembly is entirely self-contained and requires no external connections except an electrical connection for an igniter and electrical connections to the control valve which steers the rocket.

It will be noted that there are no relatively moving parts in the reaction engine itself and that the hydraulic steering motor is of a very simple and trouble-free type. The description of preferred embodiments of the invention to explain the principles thereof is not to be considered as limiting the invention, since many modifications may be made by the exercise of skill in the art.

I claim:

1. Attitude control means for a vehicle comprising, in combination, a reaction engine, means mounting the engine on the vehicle for rotation about an axis, and means for rotating the engine; the engine comprising a gas generator and a jet nozzle, the nozzle being inclined to the said axis; the rotating means comprising a hydraulic motor coupled between the vehicle and the engine including parts relatively rotatable about the said axis, a remotely controllable reversing valve coupled to and controlling the motor, a reservoir for supplying hydraulic fluid to the valve, and means for bleeding motive fluid under pressure from the engine to the reservoir to pressurize the hydraulic fluid, the valve and reservoir being mounted on the engine for rotation therewith.

2. An attitude control means as recited in claim 1 in which the gas generator, reservoir, and motor are coaxial.

3. An attitude control means as recited in claim 1 in which the gas generator and motor are coaxial and the reservoir is offset from the gas generator-motor axis.

4. Attitude control means for a vehicle comprising, in combination, a reaction engine, means mounting the engine on the vehicle for rotation about an axis, and means for rotating the engine; the engine comprising a gas generator and a jet nozzle, the nozzle being inclined to the said axis; the rotating means comprising a hydraulic motor coupled between the vehicle and the engine including parts relatively rotatable about the said axis, a remotely controllable reversing valve coupled to and controlling the motor, a reservoir for supplying hydraulic fluid to the valve, and means for bleeding motive fluid under pressure from the engine to the reservoir to pressurize the hydraulic fluid, the valve and reservoir being fixed to the engine for rotation therewith; the vehicle having an outer case and a propulsion nozzle therein, and the mounting means comprising two bearings supported respectively by the outer case and the propulsion nozzle.

5. An attitude control means as recited in claim 4 including a discharge line from the hydraulic motor rotatable with and discharging generally parallel to the jet nozzle.

References Cited in the file of this patent

UNITED STATES PATENTS

| 1,484,881 | Gill | Feb. 26, 1924 |
| 2,778,338 | Shafer | Jan. 22, 1957 |
| 3,004,734 | Radford | Oct. 17, 1961 |